Patented Sept. 3, 1940

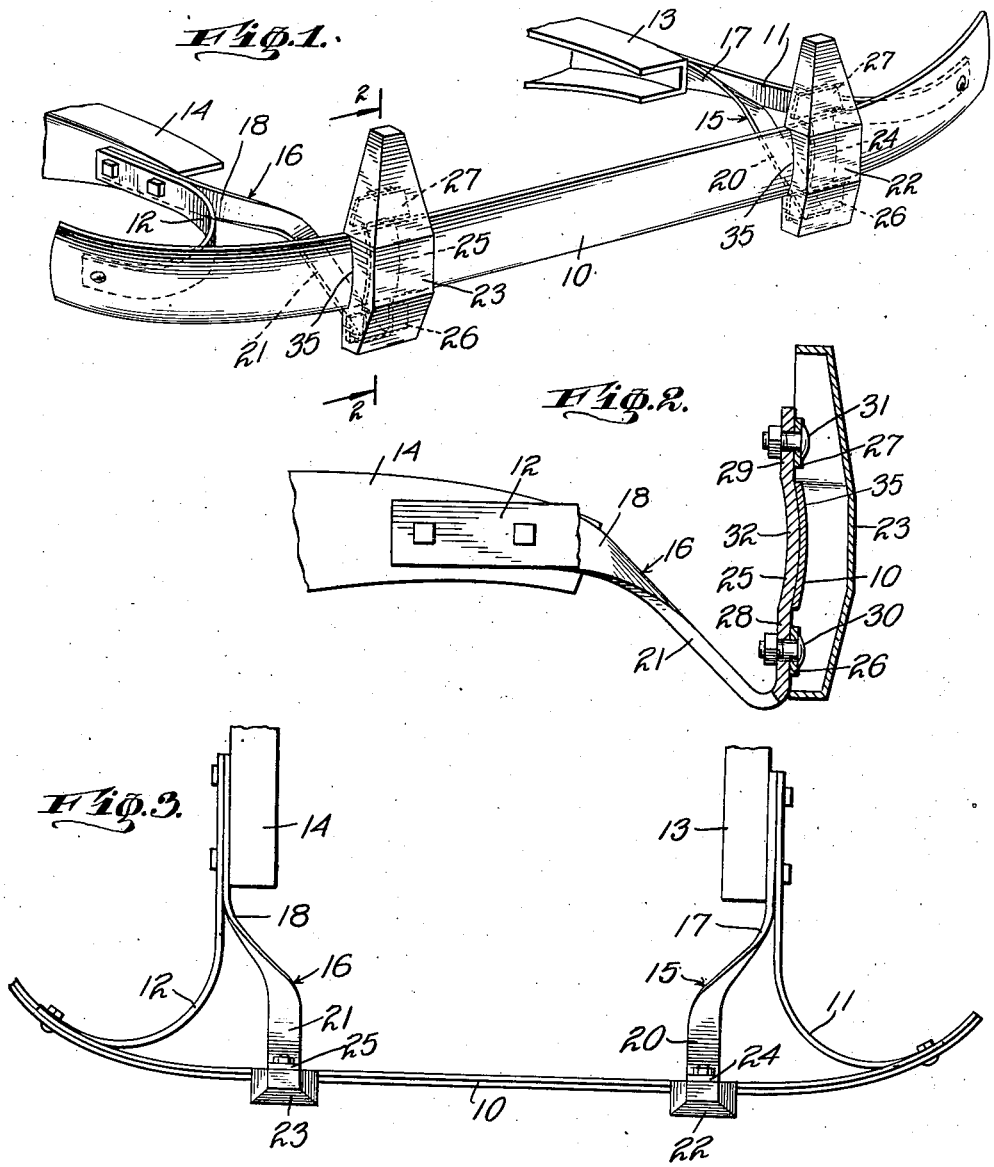

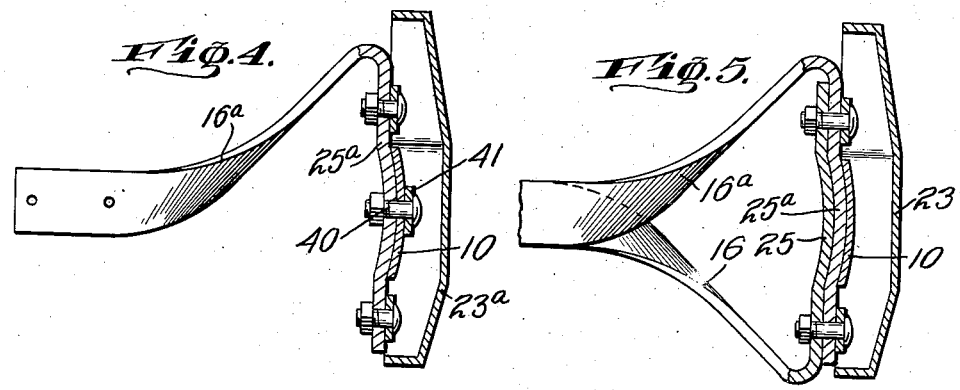
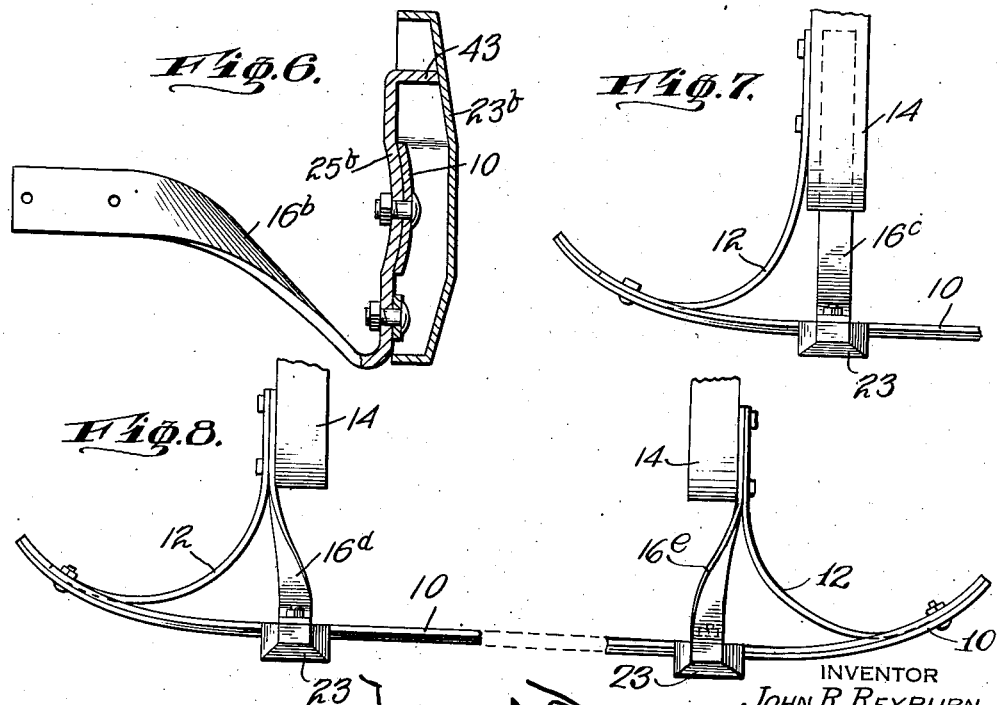

2,213,592

UNITED STATES PATENT OFFICE 2,213,592

VEHICLE BUMPER

John R. Reyburn, Fairfield, Conn., assignor to American Chain & Cable Company, Inc., a corporation of New York Application February 25, 1938, Serial No. 192,434

22 Claims. (Cl. 293—55)

This invention relates to improvements in bumpers for vehicles, more particularly those of the type in which a horizontal bumper bar is arranged either in front of or behind, or both in front of and behind, the vehicle for the prevention of injury to the vehicle if it runs into an obstacle, or is run into by another vehicle. Such bumpers have been found satisfactory for protecting the parts of the vehicle directly in line with the bumper bar against objects which are directly in line with the bumper bar. With a vehicle having a low hung frame the bumper bar is usually lower than in the case of a vehicle having a higher hung frame. The bumper bar of one of the colliding vehicles may be higher or lower than the bumper bar of the other due to grade changes in the road. To prevent overlapping and overriding bumper bars have been increased in depth in certain instances and in other instances they have been provided with vertical guards.

When the bumper bar of one vehicle hits the upper end of a vertical guard on the bumper bar of another vehicle, it tends to tilt the vertical guard by bending the supporting bumper bar and thereby reduces the effective height of the vertical guards. As a result, the bumper bar of one vehicle overrides the vertical guard on the bumper bar of the other vehicle and hooks over the same causing injury to the vehicle or vehicles and also prevents disengagement of the bumper bars.

Among the objects of my invention is the provision of means whereby the tendency for such vertical guard and bumper bar to rotate about an axis longitudinally of the bumper bar is resisted by spring means secured to the vehicle and to said vertical guard and to the bumper bar which spring means may in one embodiment of the invention be a spring bracket which supports the bumper bar. One of a pair of spring brackets may be bent so as to cross the bumper bar at right angles thereto and may have portions which engage the vertical guard above and below the bumper bar whereby any tendency of the vertical guard to rock will be resisted by the spring bracket.

Other objects of the invention will appear from the following description taken in connection with the drawings, in which—

Fig. 1 is a perspective view of a bumper bar construction showing one embodiment of my invention;

Fig. 2 is a section on the line 2—2 of Fig. 1;

Fig. 3 is a top plan view of the construction shown in Fig. 1;

Fig. 4 shows a modified construction of a spring bracket;

Fig. 5 shows a construction in which two opposing spring brackets are employed;

Fig. 6 shows a further modified form of the spring bracket shown in Fig. 1;

Fig. 7 shows a further modification of the spring bracket; and

Fig. 8 shows still a further modification of the spring bracket, showing reversely disposed brackets at opposite ends of the bumper bar.

I have shown my invention in connection with a bumper bar 10 which consists of a bar of steel of much greater height than thickness and which may be curved transversely. The invention is applicable to bumper bars of other cross sectional shapes. The bumper bar is supported by spring brackets 11 and 12 secured to the bumper bar in the usual manner and also secured to the channel frame members 13 and 14 of the vehicle by bolts which also secure inner spring brackets 15 and 16 to the channel frame members. The spring brackets 11 and 12 curve outwardly and are of conventional shape. In a conventional construction, the inner brackets curve toward each other with their ends extending in the direction of the bumper bar and secured thereto.

For the purpose of disclosing my invention, I have shown in Figs. 1, 2 and 3, the inner resilient spring brackets 15 and 16 as twisted and curved toward each other as indicated at 17 and 18 and as bent downwardly as indicated at 20 and 21 slightly below the plane of the lower ends of the vertical guards 22 and 23 and then bent upwardly to provide vertical portions 24 and 25.

As the constructions of the vertical portions of the brackets are the same, I will describe the connection between such vertical portions and the vertical guards by reference to Fig. 2. As shown in Fig. 2, the vertical guard 23 is provided with a lower bridging or cross member 26 and an upper bridging or cross member 27 connected to the side flanges of the vertical guard by welding or the like or by being cast or otherwise formed as an integral part thereof, against which straight or flat portions 28 and 29 of the vertical portion 25 of the bracket may be secured by means of bolts 30 and 31. The intermediate portion 32 of the vertical portion 25 is preferably curved to fit the curvature of the bumper bar 10. The construction of the vertical portion may be such that the intermediate portion 32 is pressed to the rear relatively to the straight portions 28 and 29 when the vertical guard is secured to the vertical portion 25 to prevent rattling between the bumper bar and the vertical portion of the spring bracket and also to create friction against the nuts on the bolts. To prevent relative vertical movement between the spring brackets and the vertical guard and the bumper bar the flanges of the guard are preferably recessed as indicated at 35 to fit and receive the bumper bar 10. The spring bracket may also engage the lower cross flange on the vertical guard. The inner ends of the brackets may be secured to the webs of the channel frame members in the usual manner and their outer ends may support the vertical guards and bumper bar without necessitating perforating the bumper bar at these points.

Impacts against the lower end of the vertical guard 23 will be opposed by the resistance to compression of the bracket 16 which also resists any tendency of the vertical guard to cam over any obstacle or other bumper bar of another vehicle. Impacts directly on the center of the vertical guard will be transferred directly to the spring bracket 16 and through the bumper bar to the adjacent spring bracket 12. Impacts on the upper end of the vertical guard which tend to tilt the guard toward the rear and to bend the bumper bar will be opposed by the resistance to bending of the vertical portion 25 with respect to the rearwardly extending portion of the spring bracket. Such tendency to tilt will also be opposed by the tension of the spring arm 16 as is understood by considering the bumper bar 10 as operating as a fulcrum under such impacts.

While I have disclosed the spring brackets as being secured to the outer faces of the channel frame members 13 and 14, it is understood, of course, that they may be secured to the inner faces thereof or one of each pair of spring brackets could be secured to the outer face and the other to the inner face of the channel frame member.

The modified form of spring bracket indicated at 16a Fig. 4 may be bent upwardly and then downwardly as at 25a and may be secured to the vertical bumper guard in the same way in which the bracket disclosed in Figs. 1, 2 and 3 is secured thereto, and additionally by a bolt 40 which passes through the bracket and the bumper bar and through a cross web 41 integral with or secured to the vertical guard 23a. In this construction, rearward or counter-clockwise tilting is opposed directly by the resistance to compression of the spring bracket.

In Fig. 5 I have disclosed a pair of spring brackets corresponding to brackets 16 and 16a and having their vertical portions 25 and 25a overlapping and secured to the cross webs bridging the side flanges of the vertical guard 23 by means of bolts as indicated.

In Fig. 6 I have shown another modified form of the spring bracket indicated at 16b in which the vertical portion 25b is provided with a forwardly bent extension 43 which may engage the rear face of the vertical guard 23b. In this construction I may omit the cross member 27, Fig. 2. The vertical portion 25b is preferably secured to the bumper bar 10 by means of a bolt as indicated, and if desired, this construction may also include a web such as 41 shown in Fig. 4.

In all the constructions so far described the free end of the vertical portion of the spring bracket may terminate at the far edge of the bumper bar, the brackets still effectively functioning to prevent tilting and rocking of the vertical guard.

As shown in Fig. 7, the spring bracket included in my improvement may be connected to a transverse portion of the frame member and may be connected to either transverse portion thereof but preferably to the lower portion especially when the bracket indicated at 16c is bent downwardly and then upwardly as indicated in Fig. 2. If the bracket is bent upwardly and then downwardly as indicated in Fig. 4, the bracket may be secured if desired on the upper flange of the frame member. In this modification the bracket is not bent laterally with respect to the frame member but is carried directly forward as indicated and the vertical guard 23 is in alinement with the frame member 14.

As disclosed in Fig. 8 the bracket 16d, may be bent so that its vertical portion is in alinement with the frame member 14. In this construction the brackets 16d and 12 may be secured to the channel member in the conventional manner and the vertical guard 23 may be located directly in front of the frame member 14.

As shown in this figure, I may use a downwardly bent bracket 16d on one side of the vehicle and an upwardly bent bracket 16e, on the other side of the vehicle. This will provide for a balanced construction in which the tendencies for the bumper bar and vertical guards to rock clockwise and counter-clockwise are opposed by equal forces. This is especially true when the bumper bar 10 is made less flexible and substantially rigid.

It is obvious also, of course, that the location of the vertical guards with respect to the vehicle may be changed and that the brackets may be changed as required for connection to the vertical guards and the side members of the frame and that if desired these brackets may be secured to other parts of the vehicle.

The spring brackets I have disclosed efficiently cushion the bumper bar against impacts from various angles and may be used without the use of vertical guards as supports for any conventional type of bumper bar of the usual or of increased vertical depth.

While I have described various forms of embodiments of my invention, it is to be understood that this is not to be taken as showing all the possible forms of embodiments but merely as illustrations of various ways in which the principles of my invention may be carried out. It is to be understood therefore that the disclosure herein made is not to be taken as limitative but merely as illustrative and that I reserve the right to make various changes in form, construction and arrangement of parts that fall within the principles of this invention and within the scope of the claims appended hereto.

I claim:

1. A vehicle bumper comprising a horizontally extending bumper bar, spaced vertical guards extending above and depending below said bumper bar, spring bar brackets secured to the vehicle and provided with vertical portions extending above and depending below said bumper bar and in alinement with said guards, and means securing said guards and bumper bar to said brackets.

2. A vehicle bumper comprising a horizontally extending bumper bar, spaced vertical guards extending above and depending below said bumper bar, spring bar brackets secured to the vehicle and terminating in vertical portions extending above and depending below said bumper bar and in alinement with said guards, and means securing said guards and bumper bar to said brackets.

3. A vehicle bumper comprising a horizontally extending bumper bar, spaced vertical guards extending above and depending below said bumper bar and recessed to receive said bumper bar, spring bar brackets secured to the vehicle and provided with vertical portions extending above and depending below said bumper bar and in alinement with said guards, the upper and lower ends of said vertical portions engaging the rear side of said guards and the center portion engaging the rear face of said bumper bar, and means securing the upper and lower portions of said guards to said upper and lower ends of said vertical portions.

4. A vehicle bumper comprising a horizontally extending bumper bar, spaced vertical guards extending above and depending below said bumper bar and recessed to receive said bumper bar, spring bar brackets secured to the vehicle and terminating in vertical portions extending above and depending below said bumper bar and in alinement with said guards, the upper and lower ends of said vertical portions engaging the rear sides of said guards and the center portion being constructed to engage the rear face of said bumper bar, in advance of the engagement of said upper and lower ends of said vertical portions with said guards, and means securing the upper and lower portions of said guards against the upper and lower ends of said vertical extending portions.

5. A vehicle bumper comprising a horizontally extending bumper bar, spaced vertical guards extending above and depending below said bumper bar, spring bar brackets provided with portions in a vertical plane secured to said vehicle and being bent downwardly and laterally into alinement with the lower ends of the vertical guards and upwardly in alinement with the rear faces of the vertical guards and extending above said bumper bar, and means securing said guards and bumper bar to said brackets.

6. A vehicle bumper comprising a horizontally extending bumper bar, spaced vertical guards extending above and depending below said bumper bar, spring bar brackets provided with portions secured to said vehicle and being bent downwardly into alinement with the lower ends of the vertical guards and upwardly in alinement with the rear faces of the vertical guards and extending above said bumper bar, and means securing said guards and bumper bar to said brackets.

7. A vehicle bumper comprising a horizontally extending bumper bar, spaced vertical guards extending above and depending below said bumper bar, supporting brackets provided with portions secured to the vehicle, said brackets being bent downwardly into alinement with the lower ends of the vertical guards and then upwardly vertically parallel to the rear faces of said guards, said guards being recessed to receive the bumper bar and said vertical extending portions being bent to engage and conform to the transverse cross sectional shape of said bar, and means securing the guards to the upper and lower ends of said vertical extending portions.

8. A vehicle bumper comprising a horizontally extending bumper bar of arcuate cross section, spaced vertical guards extending above and depending below said bumper bar, supporting brackets provided with portions secured to the vehicle, said brackets being bent downwardly into alinement with the lower ends of the vertical guards and then upwardly vertically parallel to the rear faces of said guards, said guards being recessed to receive the bumper bar and said vertical extending portions being bent to engage and conform to the cross section of said bar, and means securing the guards to the upper and lower ends of said vertical extending portions.

9. A vehicle bumper comprising a horizontally extending bumper bar, spaced vertical guards extending above and depending below said bumper bar, supporting brackets secured to the vehicle and being bent upwardly into engagement with said vertical guards at a point above the bumper bar and then being bent downwardly into engagement with the guard at a point below said bumper bar, and means for securing the vertical guards and said bumper bar to said brackets.

10. A vehicle bumper comprising a horizontally extending bumper bar, spaced vertical guards extending above and depending below said bumper bar, supporting brackets secured to the vehicle and being bent upwardly into engagement with said vertical guard at a point above the bumper bar and then being bent downwardly into engagement with the guard at a point below said bumper bar, and means for securing the vertical guards and engaging parts of said brackets together and securing the bumper bar to said brackets.

11. A vehicle bumper comprising a horizontally extending bumper bar, spaced vertical guards extending above and depending below said bumper bar, a pair of opposed brackets for each vertical guard having overlapping portions secured to said vehicle and extending respectively downwardly and upwardly into alinement with the lower and upper ends of said vertical guards, and further extending upwardly and downwardly respectively in alinement with the rear faces of said vertical guards, and means for securing said guards and bumper bar to said vertically extending portions.

12. A vehicle bumper comprising a horizontally extending bumper bar, spaced vertical guards extending above and depending below said bumper bar, a pair of opposed brackets for each vertical guard having overlapping portions secured to said vehicle and extending respectively downwardly and upwardly into alignment with the lower and upper ends of said vertical guards, and further extending in overlapping relation upwardly and downwardly respectively in alinement with the rear faces of said vertical guards, and means securing said guards and bumper bar to said overlapping vertically extending portions.

13. A vehicle bumper comprising a horizontally extending bumper bar, a guard extending above and depending below said bumper bar, a spring bar bracket secured to the vehicle and provided with a portion extending into alinement with the lower end of the vertical guard, an upwardly extending portion paralleling the rear face of the guard, and a forwardly extending portion engaging the guard at a point above the bumper bar, and means for securing the bumper bar and vertical guard to said bracket.

14. A vehicle bumper comprising a horizontally extending bumper bar, a vertical guard extending above and depending below said bumper bar, a spring bar bracket secured to the vehicle and provided with a portion extending into alinement with one end of the vertical guard, a vertical portion on said bracket paralleling the rear face of the guard, and a forwardly extending portion on said vertical portion engaging the guard at a point between the bumper bar and the other end of the guard, and means securing the bumper bar and vertical guard to said bracket.

15. A vehicle bumper comprising a horizontally extending bumper bar, a vertical guard extending above and depending below said bumper bar, a spring bar bracket secured to the vehicle and extending into contact with one end of said vertical guard and further extending parallel to the rear face of said guard and into contact with the other end of said vertical guard, and means for securing said vertical guard and bumper bar to said bracket.

16. A vehicle bumper comprising a horizontally extending bumper bar, a vertical guard extending above and depending below said bumper bar, a spring bar bracket secured to the vehicle and extending into contact with one end of said vertical guard and further extending parallel to the rear face of said guard and into contact with the other end of said vertical guard, and means for securing said first mentioned end of said vertical guard and said bumper bar to said bracket.

17. A vehicle bumper comprising a horizontally extending bumper bar, spaced vertical guards extending above and depending below said bumper bar, a spring bar bracket associated with one of said guards secured to said vehicle and having an upwardly extending portion and a downwardly extending portion paralleling the rear face of said guard, means securing the upper and lower portions of said guard to said downwardly extending portion on opposite sides of said bumper bar, and a spring bar bracket on the other side of the vehicle secured to said vehicle and extending downwardly and then upwardly parallel to the rear face of the other of said guards, and means securing said guard to said upwardly extending portion at points below and above said bumper bar.

18. A vehicle bumper comprising a horizontally extending bumper bar, a spring bar bracket secured to the vehicle and engaging the rear face of said bar and having portions projecting above and below said bar, a vertical guard engaging the front face of said bar and located in alinement with said projecting portions of said bracket, and means securing said guard to said projecting portions.

19. A vehicle bumper comprising a horizontally extending bumper bar, a vehicle supported spring bar bracket and a vertical guard located on opposite sides of said bar, and having portions projecting beyond at least one edge of said bar, and means securing said projecting portions together.

20. A vehicle bumper comprising a horizontally extending bumper bar, a vehicle supported spring bar bracket and a vertical guard located on opposite sides of and embracing said bar, said bar being imperforate in the region of said bracket and guard, and means securing said guard to said bracket.

21. A vehicle bumper comprising a horizontally extending bumper bar, a pair of spring bar brackets extending in a horizontal plane and connected to said bumper bar near its ends, a second pair of spring bar brackets connected to said vehicle and lying in a vertical plane and secured to said bumper bar at points closer to the center of said bumper bar, said latter brackets being provided with portions extending above and below said bumper bar and in alignment with the rear face thereof, vertical guards bearing against said portions of said latter brackets, and means securing said guards, bumper bar and said latter brackets together.

22. A vehicle bumper construction comprising a horizontal bumper bar, a vertical guard associated with said bar, a spring bar bracket secured to the vehicle and having a portion lying adjacent one end of said vertical guard and another portion lying adjacent said bumper bar, and means securing said bracket to said end of said vertical guard and to said bumper bar.

JOHN R. REYBURN.